(12) United States Patent
Ryan et al.

(10) Patent No.: US 11,759,890 B2
(45) Date of Patent: Sep. 19, 2023

(54) LASER WELDING OF SQUARE BUTT JOINTS BETWEEN COPPER SUBSTRATES

(71) Applicant: Ford Global Technologies, LLC, Dearborn, MI (US)

(72) Inventors: Emily Ann Ryan, Allen Park, MI (US); Elizabeth Therese Hetrick, Ann Arbor, MI (US); Arnon Wexler, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 17/086,710

(22) Filed: Nov. 2, 2020

(65) Prior Publication Data
US 2022/0134479 A1    May 5, 2022

(51) Int. Cl.
| | |
|---|---|
| *B23K 26/26* | (2014.01) |
| *B23K 26/03* | (2006.01) |
| *H01R 4/02* | (2006.01) |
| *B23K 103/12* | (2006.01) |
| *B23K 101/36* | (2006.01) |

(52) U.S. Cl.
CPC ............ *B23K 26/26* (2013.01); *B23K 26/032* (2013.01); *H01R 4/021* (2013.01); *H01R 4/029* (2013.01); *B23K 2101/36* (2018.08); *B23K 2103/12* (2018.08)

(58) Field of Classification Search
CPC .... B23K 26/26; B23K 26/032; B23K 26/035; B23K 26/042; B23K 26/043; B23K 26/24–242; B23K 2103/12; B23K 2101/36; B23K 15/0013

USPC ..................................................... 219/121.64
See application file for complete search history.

(56) References Cited

U.S. PATENT DOCUMENTS

| | | | |
|---|---|---|---|
| 2010/0078412 A1* | 4/2010 | Diez .................... | B23K 26/348 219/121.64 |
| 2014/0175071 A1* | 6/2014 | Pfitzner ................ | B23K 26/034 348/90 |
| 2015/0202708 A1 | 7/2015 | Aoki et al. | |
| 2018/0236605 A1* | 8/2018 | Finuf .................. | B23K 37/0408 |
| 2020/0112236 A1* | 4/2020 | Hirao ................... | B23K 26/082 |
| 2020/0211734 A1* | 7/2020 | Tachibana .............. | H01B 1/026 |

(Continued)

FOREIGN PATENT DOCUMENTS

JP    2012179631    9/2012

OTHER PUBLICATIONS

Lamas, Javier, et al. "The effect of fit-up geometry on melt flow and weld quality in laser hybrid welding." Journal of Laser Applications 25.3 (2013): 032010. (Year: 2013).*

*Primary Examiner* — John J Norton
*Assistant Examiner* — Simpson A Chen
(74) *Attorney, Agent, or Firm* — Burris Law, PLLC

(57) ABSTRACT

A method of joining electrical connections together includes evaluating at least one weld joint between at least two substrates, determining a mismatch between the at least two substrates, and welding the at least two substrates together with a multi-step welding process. The multi-step welding process includes compensating for the mismatch between the at least two substrates by welding on both sides but not overlapping a joint line between the at least two substrate with a first welding step and increasing melt volume and penetration depth of a weld between the at least two substrates with a second welding step.

20 Claims, 5 Drawing Sheets

(56) References Cited

U.S. PATENT DOCUMENTS

2021/0053152 A1* 2/2021 Vierstraete ........... B23K 1/0056
2022/0161361 A1* 5/2022 Ryan .................... B23K 26/035

* cited by examiner

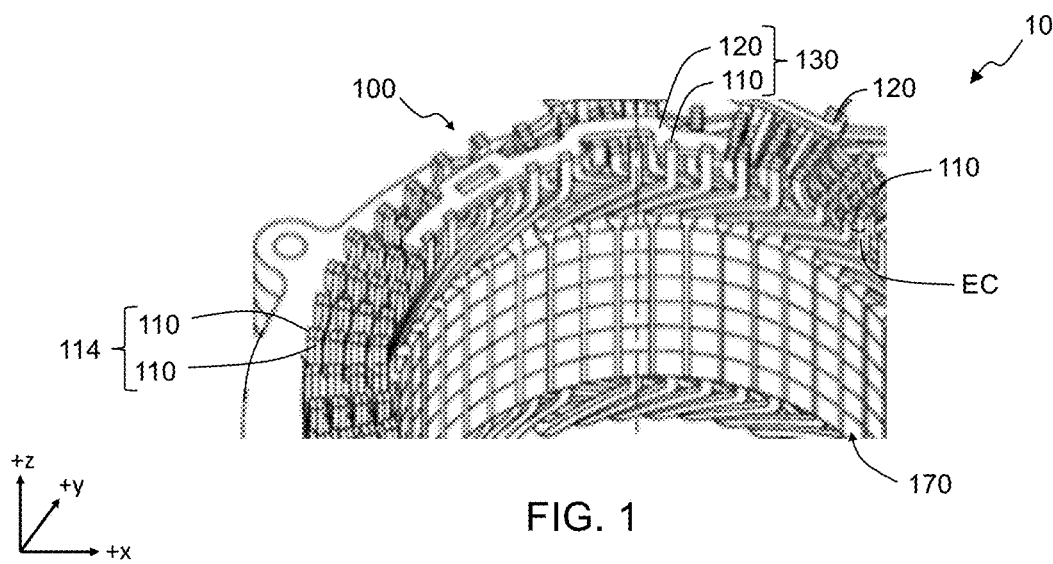
FIG. 1
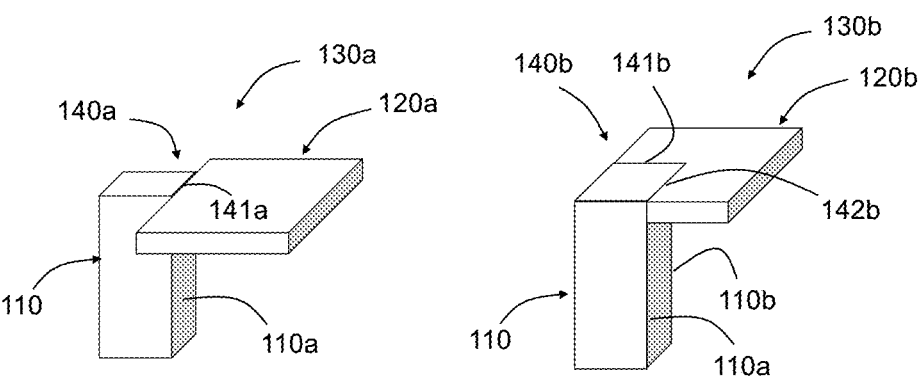
FIG. 2A        FIG. 2B
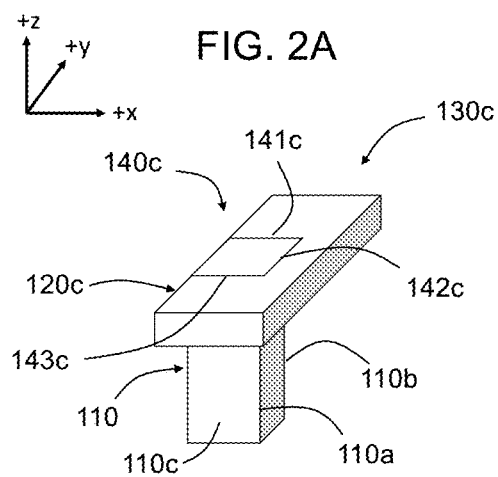 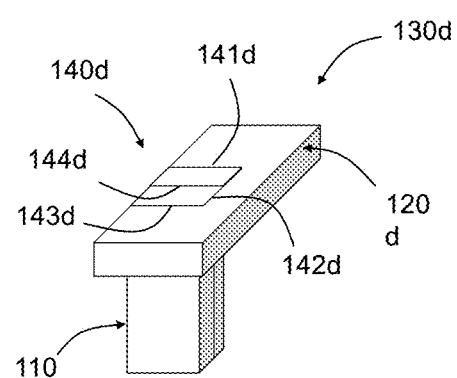
FIG. 2C        FIG. 2D

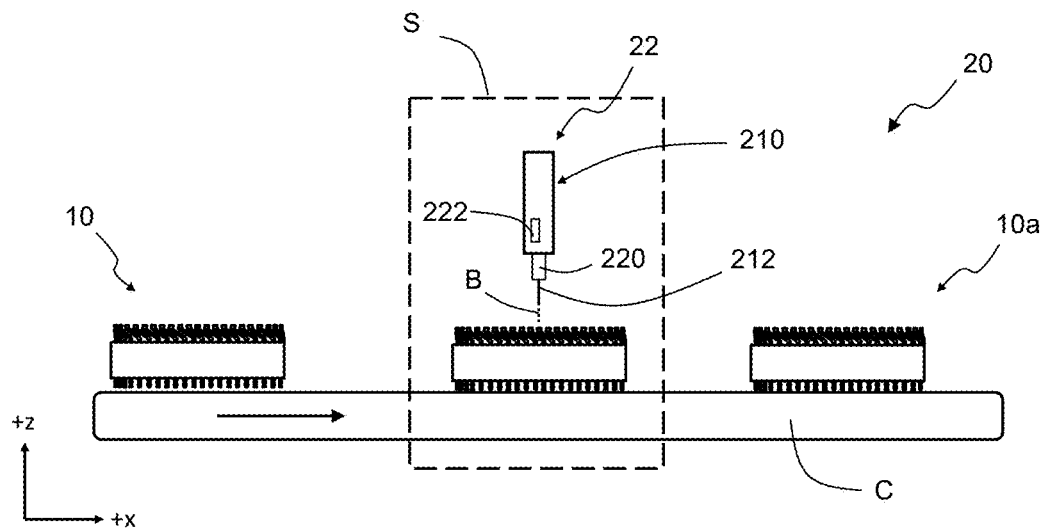
FIG. 4
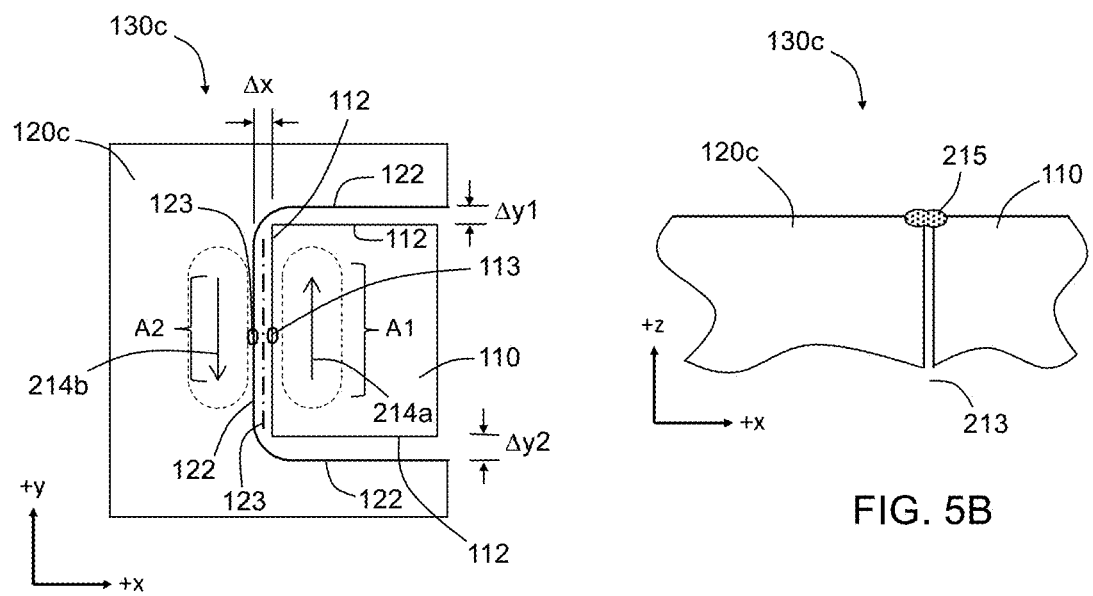
FIG. 5A
FIG. 5B

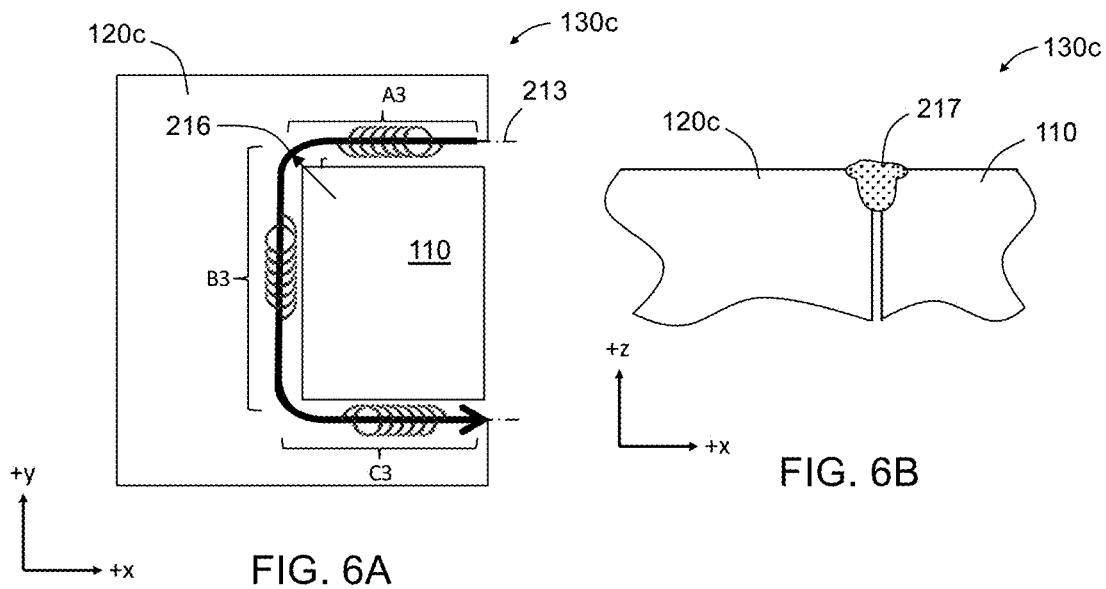
FIG. 6A
FIG. 6B
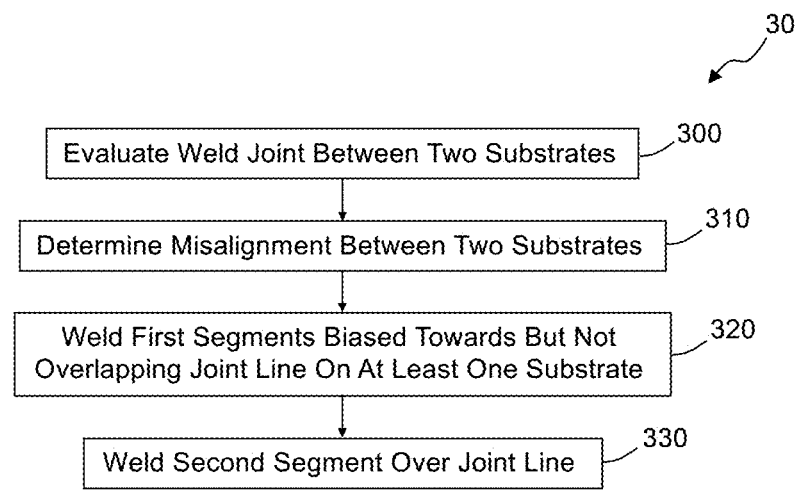
FIG. 7

LASER WELDING OF SQUARE BUTT JOINTS BETWEEN COPPER SUBSTRATES

FIELD

The present disclosure relates to welding and particularly laser welding of hairpin wires and connectors of electric motor stators.

BACKGROUND

The statements in this section merely provide background information related to the present disclosure and may not constitute prior art.

High performance electric motors have increased conductor packing density and a uniform distribution of copper windings to reduce loss during operation, improve NVH, and improve packaging space compared to traditional random wound, round wire windings. Also, uniformly distributed rectangular windings are used to form stator windings with such an increase in conductor packing density.

Rectangular windings can be formed from individual wire segments that are joined together to create a continuous electrical path. For example, spooled copper wire coated with a protective polymer layer is straightened, cut into segments, and the segments bent into U-shaped sections often referred to as 'hairpin' sections or hairpin wires. The hairpins are de-coated at joining locations (e.g., ends of the hairpins) prior to being fed through slots in a steel stator core and then joined together to form the continuous electrical path, i.e., the stator winding. In addition, connectors such as neutral connectors, terminal connectors, and/or jumper connectors are included and joined to hairpin wires such that a desired stator winding is provided.

The present disclosure addresses issues related to joining hairpin wires and connectors and other issues related to the manufacture of electric motor stators.

SUMMARY

This section provides a general summary of the disclosure and is not a comprehensive disclosure of its full scope or all of its features.

In one form of the present disclosure, a method of joining electrical connections together includes evaluating at least one weld joint between at least two substrates, determining a mismatch between the at least two substrates, and welding the at least two substrates together with a multi-step welding process. The multi-step welding process includes compensating for the mismatch between the at least two substrates by welding on both sides but not overlapping a joint line between the at least two substrate with a first welding step and increasing melt volume and penetration depth of a weld between the at least two substrates with a second welding step.

In some variations, evaluating the at least one weld joint includes identifying edges and center points of the at least two substrates, angular alignment of the at least two substrates relative to each other, gaps between the at least two substrates, and a vertical offset between the at least two offset conditions.

In at least one variation, the first welding step includes welding linear weld segments biased towards but not overlapping the joint line between the at least two substrates and the second welding step includes oscillatory welding along the joint line between the at least two substrates.

In some variations, the at least two substrates comprise a wire and a connector, for example, a hairpin wire and a connector. In at least one variation, the at least two substrates include an end of a hairpin wire and a connector. And in some variations, the at least two substrates comprise a plurality of hairpin wire and connector pairs and welding the at least two substrates together comprises the plurality of welding hairpin wire and connector pairs together by executing the first welding step and the second welding step on each of the plurality of hairpin wire and connector pairs. In at least one variation, the method further includes assembling an electric motor stator via welding the plurality of welding hairpin wire and connector pairs together. In some variations, the plurality of hairpin and connector pairs are laser welded together with a weld travel speed between 50 mm/s and 300 mm/s.

In at least one variation, the at least two substrates are vertically misaligned from each other and the first welding step reduces the vertical mismatch before the second welding step.

In some variations, the at least one weld joint between the at least two substrates is evaluated with an electronic vision system. In such variations, the electronic vision system identifies at least one position of each the at least two substrates, a size of each the at least two substrates, one or more edges of each the at least two substrates, a gap between the at least two substrates, an angle between the at least two substrates, and/or a vertical offset between the at least two substrates. In at least one variation the electronic vision system is co-axial to a laser beam welding the at least two substrates together. And in some variations the electronic vision system is at least one of a digital camera, a scanning optical coherence tomography system, a laser scanning system, and combinations thereof.

In some variations, the weld has a cross-sectional area equal to or greater than an original cross-sectional area of the substrate. And in at least one variation the substrate has a cross-sectional area of 5 square millimeters ($mm^2$) and the weld has a cross-sectional area of at least 5 $mm^2$.

In another form of the present disclosure, a method of joining electrical wiring together includes evaluating a weld joint between a hairpin wire and a connector, determining mismatch between the hairpin wire and the connector, welding at least two weld segments biased towards but not overlapping a joint line between the hairpin wire and the connector during a first welding step, and oscillatory welding along the joint line between the hairpin wire and the connector during a second welding step.

In some variations, the weld joint is evaluated with an electronic vision system prior to welding and the pre-weld evaluation includes identifying edges and center points of the hairpin wire and the connector, an angular alignment of the hairpin wire and the connector relative to each other, one or more gaps between the hairpin wire and the connector, and a vertical offset between the hairpin wire and the connector.

In at least one variation, the method further includes assembling an electric motor stator via welding the ends of a plurality of hairpin wires and a plurality of connectors together with the first welding step and the second welding step.

In still another form of the present disclosure, a method of joining electric motor stator wiring includes evaluating weld joints between hair pin segment-connector pairs of a stator winding with an electronic vision system, determining mismatch between the hair pin segment-connector pairs with the electronic vision system and transmitting at least one mismatch parameter to a laser welding system, laser welding linear weld segments biased towards but not overlapping a joint line between each of the hair pin segment and connector pairs during a first weld step and forming a weld across the joint line as a function of the at least one mismatch parameter, and oscillatory welding along the joint line between each of the hair pin segment and the connector pairs during a second weld step. In some variations, the method further includes assembling an electric motor stator via welding the hairpin segment and connector pairs together with the first welding step and the second welding step.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a portion of an electric motor stator with hairpin wires and connectors to form a stator winding of an electric motor;

FIG. 2A is a perspective view of a hairpin wire-connector pair according to one variation of the present disclosure;

FIG. 2B is a perspective view of a hairpin wire-connector pair according to another variation of the present disclosure;

FIG. 2C is a perspective view of a hairpin wire-connector pair according to still another variation of the present disclosure;

FIG. 2D is a perspective view of a hairpin wire-connector pair according to yet another variation of the present disclosure;

FIG. 4 is a side view of an assembly line with a laser welding system according to the teachings of the present disclosure;

FIG. 5A is a top view of a hairpin wire-connector pair being joined together with a first welding step according to one variation of the present disclosure;

FIG. 5B is a side view of a weld formed by the first welding step in FIG. 5A;

FIG. 6A is a top view of the hairpin wire-connector pair in FIG. 5E being welded during a second welding step according to the teachings of the present disclosure;

FIG. 6B is a side view of a weld formed by the second welding step in FIG. 6A; and FIG. 7 is a flow chart for a method according to the teachings of the present disclosure.

Figure 3A:
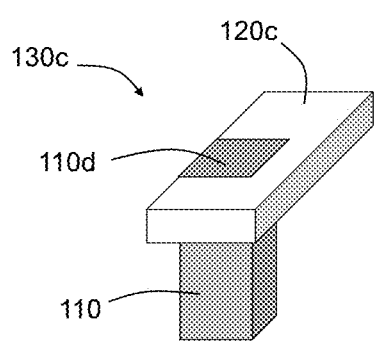
FIG. 3A is a perspective view of one type of mismatch between a hairpin wire and a connector.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a perspective view of a portion of an electric motor stator 10 (referred to herein simply as "stator 10") is shown. The stator 10 includes a stator winding 100 and a stator core 170. In some variations, the stator winding 100 is made out of copper or copper alloy wire and the stator core 170 is made from a metal or alloy such as steel. The stator winding 100 is formed from a plurality of hairpin wire sections 110 (referred to herein simply as "hairpin wires" or "wires") electrically connected (e.g., welded) to each other and electrically connected to connectors 120. Each of the hairpin wires 110 is bent or formed in a desired shape after insertion into and through the stator core 170 and have a protective enamel coating 'EC' (e.g., a multi-layer PI, polyester, PAI or PEEK coating) to electrically insulate the hairpin wires 110 from the stator core 170. Also, the hairpin wires 110 are bent and arranged such that hairpin wire pairs 114 or hairpin wire-connector pairs 130 can be joined (e.g., welded) together to form a desired stator winding and stator for an electric motor. While the hairpin wires 110 shown in FIG. 1 are rectangular hairpin wires 110 (i.e., have a rectangular cross-section, e.g., in the x-y plane in FIG. 1), it should be understood that hairpin wires with other cross-sectional shapes are included within the scope of the present disclosure.

Joining of the hairpin wire pairs 114 and the hairpin wire-connector pairs 130 according to the teachings of the present disclosure does not produce excessive damage to the protective enamel coating EC, produce spatter or stray copper debris, or create a non-uniform shape which contacts another electrical connection or provide a place for electricity to arc between isolated windings. It should also be understood that each hairpin wire pair 114 and each hairpin wire-connector pair 130 joined according to the teachings of the present disclosure have connections (i.e., welds) with low electrical resistivity, desired static strength, resistance to fatigue stresses (both vibrational and thermal) and consistent, low discontinuity metallurgical properties.

Accordingly, and given that electrical connections are typically needed for over 150 adjacent hairpin wire pairs 114 and hairpin wire-connector pairs 130 for each stator 10, welding of the adjacent hairpin wire pairs 114 and the hairpin-connector pairs 130 in a timely and cost efficient manner is a complex manufacturing challenge.

Referring to FIGS. 2A-2D, examples of hairpin wire-connector pairs 130a-130d and weld joints 140a-140d between hairpin wires 110 and connectors 120a-120d are shown. For example, FIG. 2A shows a hairpin wire-connector pair 130a with a hairpin wire 110 and a connector 120a, and a weld joint 140a with a single joint line 141a between the hairpin wire 110 and the connector 120a. Also, the weld joint 140a is a simple butt weld joint with a single joint line 141a between the hairpin wire 110 and the connector 120a. While the joint line 141a is shown as a linear joint line in FIG. 2A, in some variations the joint line 141a can be non-linear. It should also be understood that a weld electrically connecting the hairpin wire 110 to the connector 120a is generally formed along the joint line 141a and other joint lines discussed herein.

Referring to FIG. 2B, a hairpin wire-connector pair 130b with a weld joint 140b having a first joint line 141b and a second joint line 142b between the hairpin wire 110 and the connector 120b is shown. The connector 120b has a corner section (not labeled) for placement or positioning of the hairpin wire 110 such that two sides 110a, 110b of the hairpin wire 110 can be welded to the connector 120b.

FIG. 2C shows a hairpin wire-connector pair 130c with a weld joint 140c having a first joint line 141c, a second joint line 142c, and a third joint line 143c between with the hairpin wire 110 and the connector 120c. The connector 120c has a slot section (not labeled) for placement or positioning of the hairpin wire 110 such that three sides 110a, 110b, 110c of the hairpin wire 110 can be welded to the connector 120b.

FIG. 2D shows a hairpin wire-connector pair 130d with two hairpin wires 110 placed or positioned within a slot (not labeled) of a connector 120d. The hairpin wire-connector pair 130d has a weld joint 140d with a first joint line 141d, a second joint line 142d, and a third joint line 143d similar to the weld joint 140c shown in FIG. 2C. However, the weld joint 140d also includes a fourth joint line 144d between the two hairpin wires 110. As shown in FIGS. 2A-2D, different types and/or configurations of weld joints are included in the manufacture of the stator 10.

Figure 3B:
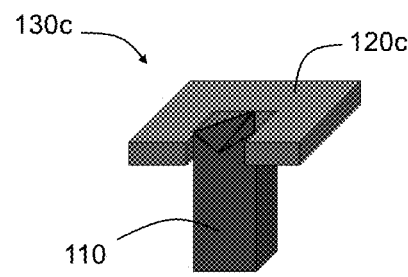
FIG. 3B is a perspective view of another type of mismatch between a hairpin wire and a connector.
Figure 3C:
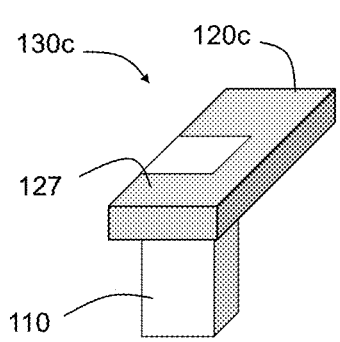
FIG. 3C is a perspective view of still another type of mismatch between a hairpin wire and a connector.
Figure 3D:
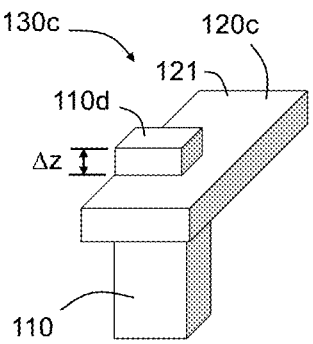
FIG. 3D is a perspective view of yet another type of mismatch between a hairpin wire and a connector.
Figure 3E:
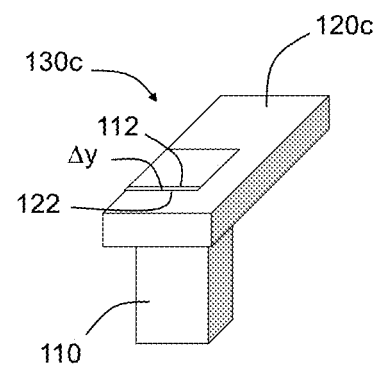
FIG. 3E is a perspective view of still yet another type of mismatch between a hairpin wire and a connector.
Figure 3F:
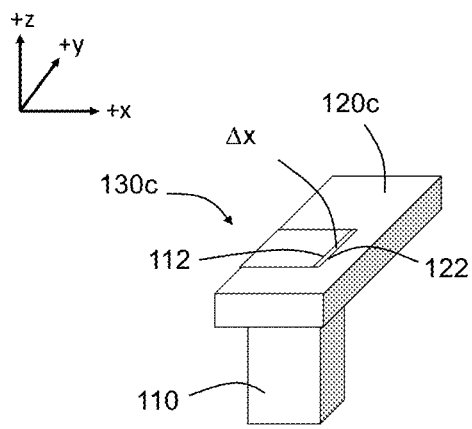
FIG. 3F is a perspective view of another type of mismatch between a hairpin wire and a connector.
Figure 3G:
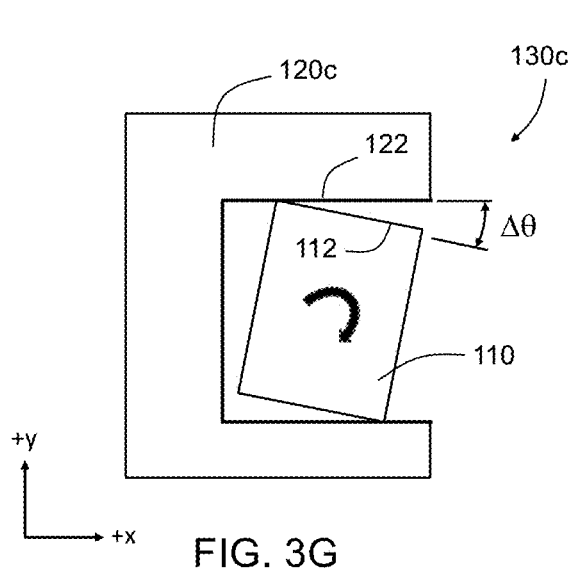
FIG. 3G is a top view of still another type of mismatch between a hairpin wire and a connector.

Referring now to FIGS. 3A-3G, in some variations of the present disclosure a hairpin wire-connector pair 130 has a mismatch between the hairpin wire 110 and the connector 120. As used herein, the term "mismatch" refers to a physical, geometrical or chemical difference between a joining surface or edge of a hairpin wire 110 and a joining surface or edge of a connector 130 forming a hairpin wire-connector pair 130. For example, FIG. 3A shows a hairpin wire-connector pair 130c with a physical mismatch resulting from a difference in reflectivity between the upper surface (+z direction) of the hairpin wire 110 and the connector 120c, and FIG. 3B shows a geometric mismatch resulting from an uneven upper surface of the hairpin wire 110. Also, FIG. 3C shows a chemical mismatch resulting from a coating 127 (e.g., a thin metallic coating) on the connector 120c, FIG. 3D shows a geometric mismatch resulting from a vertical difference '$\Delta z$' between an upper surface 110d of the hairpin wire 110 and an upper surface 121 of the connector 120c, and FIG. 3E shows a geometric mismatch resulting from a lateral gap '$\Delta y$' between an edge 112 of the hairpin wire 110 and an edge 122 of the connector 120c. FIG. 3F shows another geometric mismatch resulting from an insertion gap '$\Delta x$' between another edge 112 of the hairpin wire 110 and another edge 122 of the connector 120c, and FIG. 3G shows still another geometric mismatch resulting from an angular misalignment '$\Delta \theta$' between the hairpin wire 110 and the connector 120c as measured by an angle between an edge 112 of the hairpin wire 110 and an edge 122 of the connector 120c. Accordingly, different types mismatches can be present between a hairpin wire 110 and a connector 120 that a form a given hairpin wire-connector pair 130.

Given the various types of weld joints and the range of mismatches that can be present between a hairpin wire 110 and a connector 120, it should be understood that welding of hairpin wire-connector pairs 130 in a cost and time efficient manner is a complex manufacturing process. Accordingly, and with reference to FIG. 4, a laser welding system 22 for taking into account the various types of weld joints and compensating for the range of mismatches noted above is shown. In some variations, an assembly line 20 includes a conveyor 'C' that transports stators 10 with a plurality of hairpin wire-connector pairs 130 (not yet welded together) through a laser welding station 'S' where the laser welding system 22 is located.

The laser welding system 22 includes a laser source 210 with a fiber 212 and an electronic vision system 220. One non-limiting example of the laser source 210 is a 6 kW Trumpf TruDisk laser (1035 nm) with a Trumpf PFO-33 optic and one non-limiting example of the core ring fiber 212 is a Trumpf Brightline 50/200 um core ring fiber. Non-limiting examples of the electronic vision system 220 include a digital camera, a scanning optical coherence tomography system, and a laser scanning system. In some variations the electronic vision system 220 includes a controller 222 for analysis of acquired images. In the alternative, or in addition to, the electronic vision system 220 uses an external controller (not shown) for analysis of acquired images.

The laser welding system 22 welds hairpin wire pairs 114 and hairpin wire-connector pairs 130 together to form a stator 10a with a continuous electrical path through the stator winding 100. In some variations of the present disclosure, the laser welding system 22 executes specific weld path shapes implemented by a multi-step welding process. For example, in some variations the multi-step process is a two-step process, while in other variations the multi-step process includes more than two steps. And the laser welding system 22 is directed by the electronic vision system 220 to create a robust joint between two or more substrates (e.g., a copper hairpin wire and a copper connector) while inhibiting spatter generation and heat damage, as well as mitigating manufacturing noise sources as described below.

Referring to FIGS. 5A-5B, a pre-weld evaluation and a first welding step to join a hairpin wire 110 to a connector 120c is shown in FIG. 5A and a first weld 215 resulting from the first welding step is shown in FIG. 5B. During the pre-weld evaluation the electronic vision system 220 acquires an image of the weld joint 140c and/or the hairpin wire-connector pair 130c shown in FIG. 5A. And the controller 222 analyzes the image and determines edges 112 of the hairpin wire 110, edges 122 of the connector 120c, a center point 113 of each edge 112, a center point 123 of each edge 122, and any mismatch between the hairpin wire 110 and the connector 120c. Stated differently, prior to welding a hairpin wire-connector pair 130c, the electronic vision system 220 and the controller 222 identify the location, size, part-to-part placement of the hairpin wire 110 relative to the connector 120c, and any mismatch between the hairpin wire 110 relative to the connector 120c.

After the image of the weld joint 140c is analyzed, the controller 222 determines (e.g., calculates) a weld path, a weld joint length, at least one mismatch parameter, and/or one or more weld section origin point(s) (collectively referred to herein as "weld input parameters") of the weld joint 140c. It should be understood that the weld path can include which edges 112, 122 of a hairpin wire-connector pair 130 are to be welded together. In some variations the weld path includes welding a single pair of edges 112, 122 together, while in other variations the weld path includes welding two pair of edges 112, 122 together (FIGS. 5C-5D), and in at least one variation the weld path includes welding three pair of edges 112, 122 together (FIG. 5E). Also, non-limiting examples of the at least one mismatch parameter include a reflectively difference value between an upper surface of the hairpin wire 110 upper and an upper surface of the connector 120c, a metallic coating detection value, at least one geometric Δx, Δy, and/or Δz value, and a geometric Δθ value, among others.

The weld input parameters are transmitted to the laser welding system 22, and in response thereto, the laser welding system 22 directs the core ring fiber 212 (and a laser beam B) along a laser pattern comprising multiple shaped laser weld segments. For example, and based on the weld input parameters, the laser welding system 22 executes a first welding step that includes welding on both sides (+x direction and −x direction) of, but not overlapping, a joint line 213 of the weld joint 140c. In at least one variation of the present disclosure, the laser welding system 22 executes a first weld segment 214a on one side (+x direction) of, but not overlapping, the joint line 213 and a second weld segment 214b on an opposite side (−x direction) of, but not overlapping, the joint line 213. In some variations, the first weld segment 214a and the second weld segment 214b are biased towards, but do not overlap, the joint line 213 between the hairpin wire 110 and the connector 120c. It should be understood that the dashed ellipses in FIG. 5A represent an edge of a laser beam B (FIG. 4) propagating from the core ring fiber 212 to the hairpin wire 110 and the connector 120c, and the solid arrows 214a, 214b represent a path traversed by a center of the laser beam B.

In some variations, the laser welding system 22 executes a single pass (i.e., a single laser beam pass) to form the first weld segment 214a and/or the second weld segment 214b, while in other variations the laser welding system 22 executes more than one pass (e.g., rapid repetition) to form the first weld segment 214a and/or the second weld segment 214b. That is, depending on the type and degree (magnitude) of mismatch between the hairpin wire 110 and the connector 120c, multiple laser beam passes can be executed to reduce the degree of mismatch. In addition, a length 'A1' of the first weld segment 214a, a length 'A2' of the second weld segment 214b, and lengths of other weld segments discussed herein, can be predefined for a given type of hairpin wire-connector and/or determined as a function of the weld input parameters, process parameters, and equipment tolerances, size of a given/particular hairpin wire being welded, among others.

Although the first weld segment 214a and the second weld segment 214 b are biased towards, but do not overlap, the joint line 213 between the hairpin wire 110 and the connector 120c, in some variations of the present disclosure molten material from one or both sides of the joint line 213 (i.e., from the hairpin wire 110 and/or the connector 120c) overlaps the joint line 213 and forms a first weld 215 as shown in FIG. 5B. That is, it should be understood that a weld segment can have a molten pool that is larger than the diameter of the laser beam forming the weld segment. Accordingly, the first welding step forms a weld across the weld joint 140c without the laser beam B propagating between the hairpin wire 110 and the connector 120c.

It should be understood that forming the weld 215 using the first welding step reduces thermal damage to the enamel coating EC (FIG. 1), weld spatter and/or weld contamination. In addition, the first welding step creates a smooth uniform surface to be welded on during a second welding step described below, but does not generate significant weld volume. It should also be understood that the melt generated by the linear segments 214a, 214b removes or reduces variation due to inconsistent surface reflectivity, surface profile, or surface contamination and melts or removes thin coatings (e.g. tin) that may be present on the connector 120c.

Figure 5C:
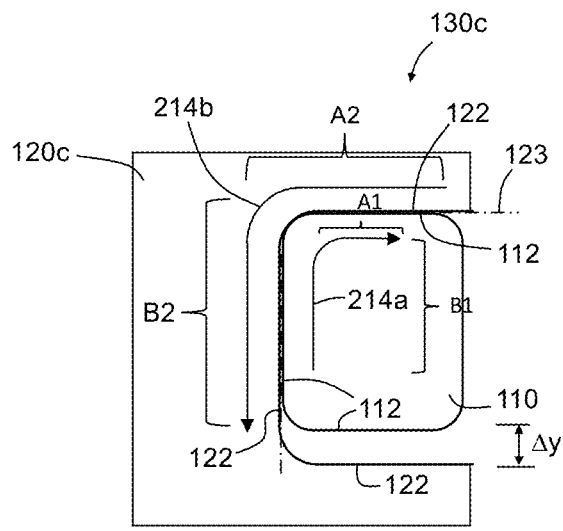
FIG. 5C is a top view of a hairpin wire-connector pair being joined together with a first welding step according to another variation of the present disclosure.
Figure 5D:
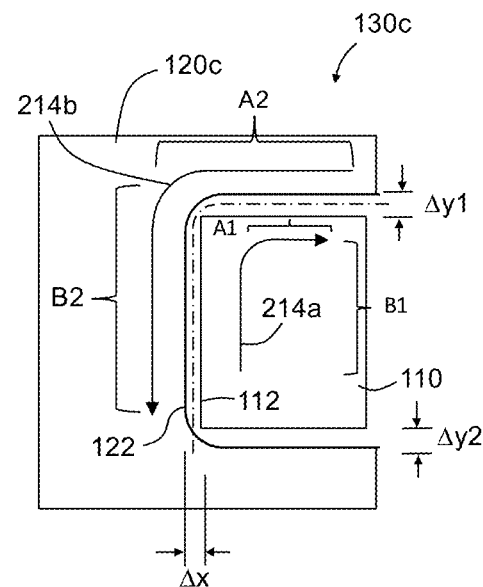
FIG. 5D is a top view of a hairpin wire-connector pair being joined together with a first welding step according to still another variation of the present disclosure.
Figure 5E:
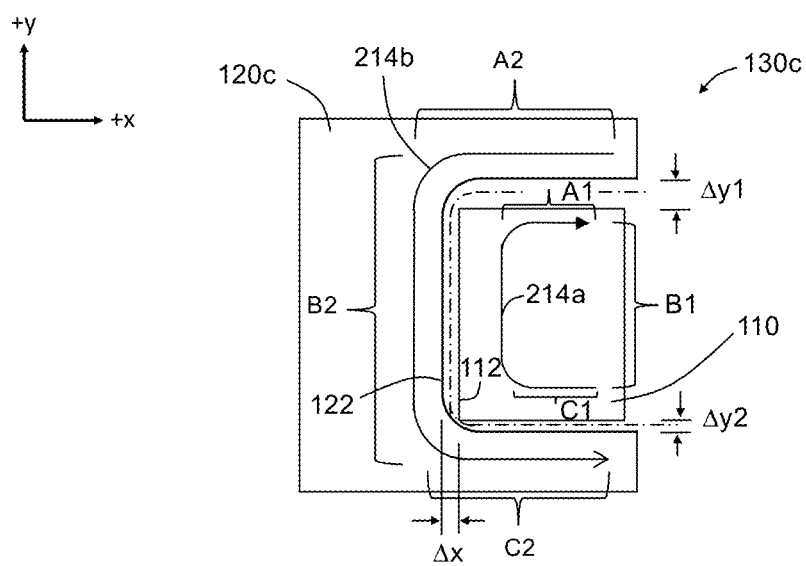
FIG. 5E is a top view of a hairpin wire-connector pair being joined together with a first welding step according to yet variation of the present disclosure.

While FIG. 5A shows an example of a weld along a single pair of edges 112, 122 (i.e., one side) between the hairpin wire 110 and the connector 120c, examples of welds along two pairs of edges (i.e., two sides) are shown in FIGS. 5C-5D and an example of a weld along three pairs of edges (i.e., three sides) is shown in FIG. 5E. Particularly, and referring to FIG. 5C, the hairpin wire 110 is laterally offset within the slot (not labeled) of the connector 120c towards an upper (+y direction) edge 122 such that a lateral gap Δy is present between a lower (−y direction) edge 112 of the hairpin wire 110 and a lower edge 122 of the connector 120c. The electronic vision system 220 detects and analyzes the geometric mismatch between the hairpin wire-connector pair 130c shown in FIG. 5C and determines the weld input parameters. Also, the laser welding system 22 executes a first weld segment 214a along two edges 112 of the hairpin wire 110 and a second weld segment 214b along opposing edges 122 of the connector 120c as shown in FIG. 5C and as a function of the weld input parameters. That is, the laser welding system 22 executes the first weld segment 214a on one side (+x direction) of the joint line 213 and the second weld segment 214b on an opposite side (−x direction) of the joint line 213 such that the first and second weld segments 214a, 214b are biased towards, but do not overlap, the joint line 213 between the hairpin wire 110 and the connector 120c. In some variations, the laser welding system 22 executes a single pass (i.e., a single laser beam pass) to form the first weld segment 214a and/or the second weld segment 214b, while in other variations the laser welding system 22 executes more than one pass (e.g., rapid repetition) to form the first weld segment 214a and/or the second weld segment 214b.

Referring to FIG. 5D, the hairpin wire 110 is laterally positioned in the slot (not labeled) of the connector 120c such that lateral gaps Δy1 and Δy2 are present between the upper and lower edges 112 (FIG. 5C) of the hairpin wire 110 and corresponding upper and lower edges 122 (FIG. 5C) of the connector 120c. Also, the hairpin wire 110 is positioned in the slot of the connector 120c such that an insertion gap Δx is present between the edge 112 of the hairpin wire 110 and the edge 122 of the connector 120c as shown in FIG. 5D. Accordingly, the electronic vision system 220 detects and analyzes the mismatch between the hairpin wire-connector pair 130c shown in FIG. 5D and determines the weld input parameters. Then, the laser welding system 22 executes a first weld segment 214a along the two edges 112 of the hairpin wire 110 and a second weld segment along the opposing two edges 122 of the connector 120c shown in FIG. 5D, and as a function of the weld input parameters. That is, the laser welding system 22 executes the first weld segment 214a on a hairpin wire side of the joint line 213 and the second weld segment 214b on a connector side of the joint line 213 such that the first and second weld segments 214a, 214b are biased towards, but do not overlap, the joint line 213 between the hairpin wire 110 and the connector 120c. In some variations, the laser welding system 22 executes a single pass (i.e., a single laser beam pass) to form the first weld segment 214a and/or the second weld segment 214b, while in other variations the laser welding system 22 executes more than one pass (e.g., rapid repetition) to form the first weld segment 214a and/or the second weld segment 214b.

Referring to FIG. 5E, the hairpin wire 110 is laterally positioned in the slot (not labeled) of the connector 120c such that lateral gaps Δy1 and Δy2 are present between the upper and lower edges 112 (FIG. 5C) of the hairpin wire 110 and corresponding upper and lower edges 122 (FIG. 5C) of the connector 120c. Also, the hairpin wire 110 is positioned in the slot of the connector 120c such that an insertion gap Δx is present between the edge 112 of the hairpin wire 110 and the edge 122 of the connector 120c shown in FIG. 5E. Accordingly, the electronic vision system 220 detects and analyzes the mismatch between the hairpin wire-connector pair 130c shown in FIG. 5E and determines the weld input parameters. Then, the laser welding system 22 executes a first weld segment 214a along the three edges 112 of the hairpin wire 110 and a second weld segment 214b along the three opposing edges 122 of the connector 120c as shown in FIG. 5E as a function of the weld input parameters. That is, the laser welding system 22 executes the first weld segment 214a on the hairpin wire side of the joint line 213 and the second weld segment 214b on the connector side of the joint line 213 such that the first and second weld segments 214a, 214b are biased towards, but do not overlap, the joint line 213 between the hairpin wire 110 and the connector 120c. In some variations, the laser welding system 22 executes a single pass (i.e., a single laser beam pass) to form the first weld segment 214a and/or the second weld segment 214b, while in other variations the laser welding system 22 executes more than one pass (e.g., rapid repetition) to form the first weld segment 214a and/or the second weld segment 214b.

It should be understood that in some variations of the present disclosure that the first weld segment 214a is a continuous weld segment and/or the second weld segment 214b is a continuous weld segment. It should also be understood that in some variations the first weld segment 214a and the second weld segment 214b described above with respect to FIGS. 5C-5E form a first weld 215 across the joint line 213 as described above and shown in FIG. 5B.

Referring now to FIGS. 6A-6B, the laser welding system 22 executes a second welding step over the joint line 213 shown in FIG. 5E such that an increase in melt volume and penetration depth of the first weld 215 results in a final weld 217 between the hairpin wire 110 and the connector 120c. Particularly, the laser welding system 22 executes a second weld 216 over the joint line 213, and in at least one variation the laser welding system 22 executes at least one continuous oscillatory weld 216 over the joint line 213 as depicted in FIG. 6A. In some variations, the energy input, welding speed, and/or number of oscillatory patterns are a function of the at least one mismatch parameter determined by the electronic vision system 220.

In some variations the segment lengths 'A', 'B', and 'C' shown in FIG. 5E and/or FIG. 6A is a function of a measured hairpin wire dimension (WD), laser beam diameter (BD), and a vision tolerance (VT) of the electronic vision system 220. For example, and assuming the hairpin wire 110 has a y-direction dimension of 3 millimeters (mm), an x-direction dimension of 2 mm, the diameter of the laser beam B is 680 micrometers (μm), and the vision tolerance of the electronic vision system 220 is 50 μm, a segment length B was calculated as WD−BD−2VT=3 mm-680 um-100 um=2.22 mm. In addition, for an original cross-sectional area (x-y plane) of the hairpin wire 110 being a 6 mm$^2$ and a desired 6 mm$^2$ weld cross-sectional area between the hairpin wire 110 and the connector 120c, the hairpin wire 110 was welded on three sides with a forward travel speed of 130 mm/s. And for the same hairpin wire 110 welded on two sides (i.e., with one side unwelded), a forward travel speed of 70 mm/s was used to create a deeper and larger weld in order to maintain at least 6 mm$^2$ cross-sectional area between the hairpin wire 110 and the connector 120c. Also, the power level of the laser beam B was reduced and/or travel speed increased near an end of a weld trace to reduce the impact of melt down near edges and at a crater location. It should be understood that a weld cross-sectional area is measured along one or more planes between a hairpin wire and a connector. For example, in FIG. 6A, the weld cross-sectional area is measured along the y-z plane and the two x-z planes between the hairpin wire 110 and the connector 120c.

It should be understood that using a continuous oscillatory laser beam pass tracing the joint line 213 results in maintaining keyhole stability while enhancing outgassing of absorbed gasses, voids or porosity from the molten pool. And a rapid growth phase of the weld reduces the amount of cycle time as compared to the cycle time needed for the same weld volume using only linear segments. Due to the instability of welding copper with an IR-wavelength laser, the oscillatory shape of the path allows for achieving adequate beam speed, maintaining stability in deep penetration welding, and rapid growth of the weld pool minimizes total heat input and resultant thermal impact to the hairpin wire 110 and connector 120c.

Referring now to FIG. 7, a method 30 of joining electrical connections together is shown. The method 30 includes evaluating a weld joint between two substrate at 300, determining any mismatch between the two substrates at 310, and welding first weld segments biased towards but not overlapping a joint line between the two substrates with a first welding step at 320. The method also includes welding a second weld segment over the joint line between the two substrates with a second welding step at 330. In this manner, a continuous electrical path through the stator winding 100 is provided with each hairpin wire-connector pair 114 connected with a weld that has low electrical resistivity, desired static strength, resistance to fatigue stresses (both vibrational and thermal) and consistent, low discontinuity metallurgical properties.

In view of the teachings of the present disclosure, it should be understood that a laser welding system and method of welding substrates together is provided. Also, the laser welding system and the method normalizes surface conditions of wires and or connectors, adapts to misalignment conditions caused by lateral gaps, insertion gaps, and vertical offsets, adapts to varied wire size, dimension, and location, and prevents enamel and tooling damage from laser light passing through the joint line during the welding process. In addition, the laser welding system and the method provides a balanced heat input to all components while maintaining low cycle times and preventing spatter generation while achieving a robust mechanical and electrical connection.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of joining electrical connections together, the method comprising:
    evaluating at least one weld joint between at least two substrates;
    determining a mismatch between the at least two substrates; and
    welding the at least two substrates together with a multi-step welding process comprising reducing the mismatch between the at least two substrates by melting on both sides of the at least one weld joint to form a melted portion that does not overlap a joint line between the at least two substrates with a first welding step and increasing melt volume and penetration depth of the melted portion between the at least two substrates with a second welding step.

2. The method according to claim 1, wherein evaluating the at least one weld joint comprises identifying edges and center points of the at least two substrates, angular alignment of the at least two substrates relative to each other, gaps between the at least two substrates, and a vertical offset between the at least two offset conditions.

3. The method according to claim 1, wherein the first welding step comprises melting linear weld segments that are biased towards but do not overlap the joint line between the at least two substrates and the second welding step comprises oscillatory welding along the joint line between the at least two substrates.

4. The method according to claim 1, wherein the at least two substrates comprise a wire and a connector.

5. The method according to claim 1, wherein the at least two substrates comprise a hairpin wire and a connector.

6. The method according to claim 1, wherein the at least two substrates comprise an end of a hairpin wire and a connector.

7. The method according to claim 6, wherein the at least two substrates comprise a plurality of hairpin wire-connector pairs and welding the at least two substrates together comprises welding the plurality of welding hairpin wire-connector pairs together by executing the first welding step and the second welding step on each of the plurality of hairpin wire-connector pairs.

8. The method according to claim 7 further comprising assembling an electric motor stator via welding the plurality of welding hairpin wire-connector pairs together.

9. The method according to claim 8, wherein the plurality of hairpin and connector pairs are laser welded together with a weld travel speed between 50 mm/s and 300 mm/s.

10. The method according to claim 1, wherein the at least two substrates are vertically misaligned from each other and the first welding step reduces the vertical misalignment before the second welding step.

11. The method according to claim 1, wherein the at least one weld joint between the at least two substrates is evaluated with an electronic vision system.

12. The method according to claim 11, wherein the electronic vision system identifies at least one of a position of each the at least two substrates, a size of each the at least two substrates, one or more edges of each the at least two substrates, a gap between the at least two substrates, an angle between the at least two substrates, and a vertical offset between the at least two substrates.

13. The method according to claim 12, wherein the electronic vision system is co-axial to a laser beam welding the at least two substrates together.

14. The method according to claim 13, wherein the electronic vision system is at least one of a digital camera, a scanning optical coherence tomography system, a laser scanning system, and combinations thereof.

15. The method according to claim 14, wherein the at least one weld joint has a cross-sectional area between the at least two substrates equal to or greater than an original cross-sectional area of at least one of the at least two substrates.

16. A method of joining electrical wiring together, the method comprising:
    evaluating a weld joint between a hairpin wire and a connector;
    determining a mismatch between the hairpin wire and the connector;
    melting at least two melted segments that are biased towards but do not overlap a joint line between the hairpin wire and the connector to reduce the mismatch between the hairpin wire and the connector during a first welding step; and
    oscillatory welding along the joint line between the hairpin wire and the connector to increase melt volume and penetration depth of the at least two melted segments during a second welding step.

17. The method according to claim 16, wherein the weld joint is evaluated with an electronic vision system and the evaluating comprises identifying edges and center points of the hairpin wire and the connector, an angular alignment of the hairpin wire and the connector relative to each other, one or more gaps between the hairpin wire and the connector, and a vertical offset between the hairpin wire and the connector.

18. The method according to claim 17 further comprising assembling an electric motor stator via welding the ends of a plurality of hairpin wires and a plurality of connectors together with the first welding step and the second welding step.

19. A method of joining electric motor stator wiring, the method comprising:
    evaluating weld joints between hairpin wire-connector pairs of a stator winding with an electronic vision system;
    determining a mismatch between the hairpin wire-connector pairs with the electronic vision system and transmitting at least one mismatch parameter to a laser welding system;
    laser melting linear melted segments that are biased towards but not do overlap a joint line between each of the hairpin wire-connector pairs to reduce the mismatch between the hairpin wire-connector pairs during a first weld step and forming a weld across the joint line as a function of the at least one mismatch parameter; and oscillatory welding along the joint line between each of the hairpin wire-connector pairs during a second weld step.

20. The method according to claim 19 further comprising assembling an electric motor stator via welding the hairpin wire-connector pairs together with the first welding step and the second welding step.

\* \* \* \* \*